United States Patent
Hung et al.

(10) Patent No.: US 8,654,265 B2
(45) Date of Patent: Feb. 18, 2014

(54) TOUCH DISPLAY PANEL AND ASSOCIATED METHOD

(75) Inventors: Guo-Kiang Hung, Hsinchu Hsien (TW); Kai-Ting Ho, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 526 days.

(21) Appl. No.: 12/950,008

(22) Filed: Nov. 19, 2010

(65) Prior Publication Data

US 2011/0187672 A1 Aug. 4, 2011

(30) Foreign Application Priority Data

Jan. 29, 2010 (TW) .............................. 99102683 A

(51) Int. Cl.
- *G02F 1/1335* (2006.01)
- *G06F 3/041* (2006.01)
- *G06F 3/045* (2006.01)

(52) U.S. Cl.
USPC .............................. 349/12; 345/173; 345/174

(58) Field of Classification Search
USPC .................................... 349/12; 345/173, 174
See application file for complete search history.

(56) References Cited

U.S. PATENT DOCUMENTS

| | | | |
|---|---|---|---|
| 6,288,707 B1 | 9/2001 | Philipp | |
| 2009/0185088 A1* | 7/2009 | Shinohara | ........................ 349/12 |

FOREIGN PATENT DOCUMENTS

| | | |
|---|---|---|
| TW | 238016 | 8/2005 |
| TW | 200726047 | 7/2007 |
| TW | 200805128 | 1/2008 |
| TW | 200915160 | 4/2009 |
| TW | 200942899 | 10/2009 |

OTHER PUBLICATIONS

Taiwan Intellectual Property Office, "Office Action", Apr. 29, 2013, Taiwan.

* cited by examiner

*Primary Examiner* — Edward Glick
*Assistant Examiner* — David Chung
(74) *Attorney, Agent, or Firm* — WPAT, PC; Justin King

(57) ABSTRACT

A conductive layer of a touch sensor and a pixel electrode conductive layer of a display panel are integrated to a touch display panel during the same fabrication. The touch sensor defines a plurality of sensor groups that are insulated from each other in a same conductive layer, and each of the sense groups is divided into a plurality of mutually-coupled first electrodes, a plurality of mutually-coupled second electrodes and a plurality of mutually-coupled third electrodes. The first electrodes and the third electrodes are insulated from each other and are horizontally interlaced. The first electrodes and the second electrodes are insulated from each other and are located on opposite sides of a horizontal symmetry axis. A gain for compensating a vertical coordinate of a touch position is introduced according to capacitance variances of the first electrodes and the second electrodes.

18 Claims, 13 Drawing Sheets

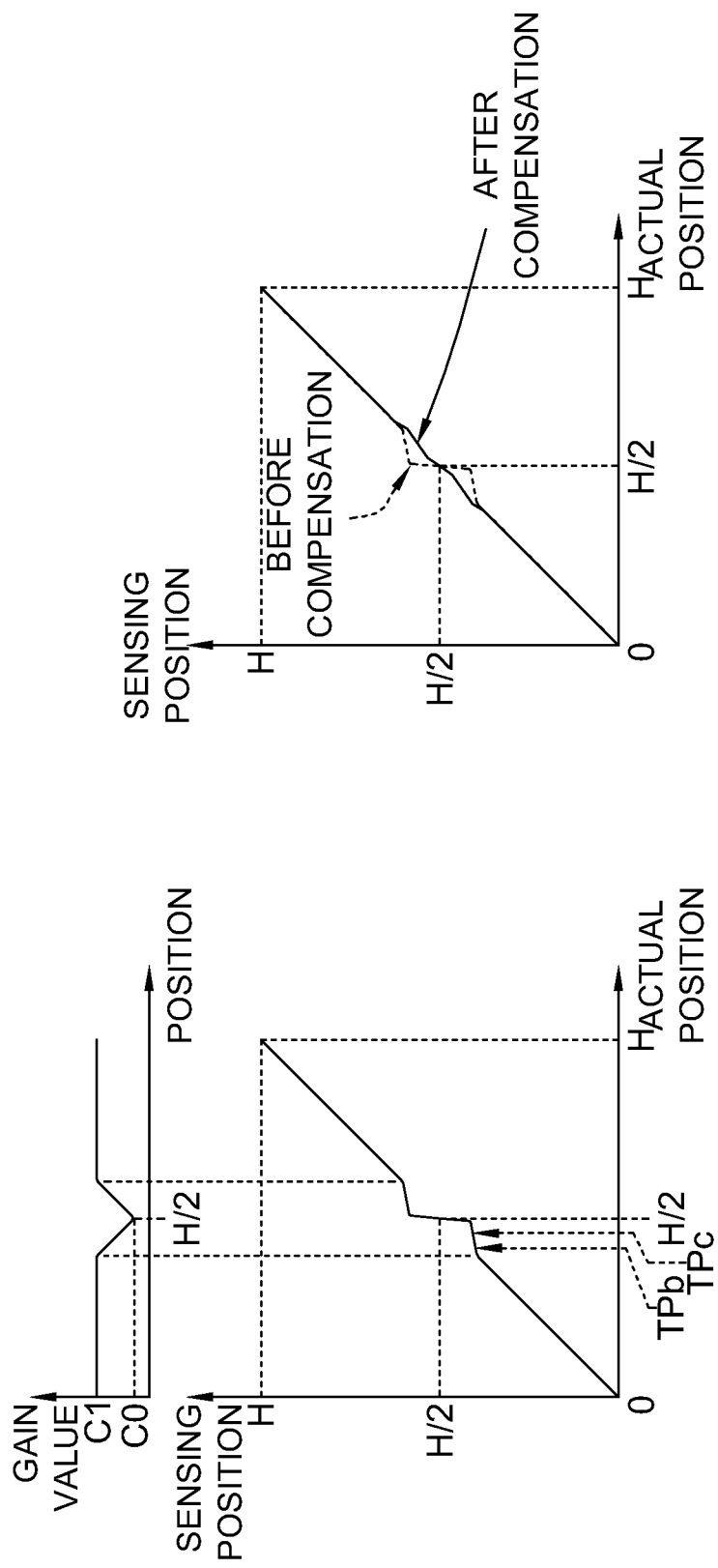

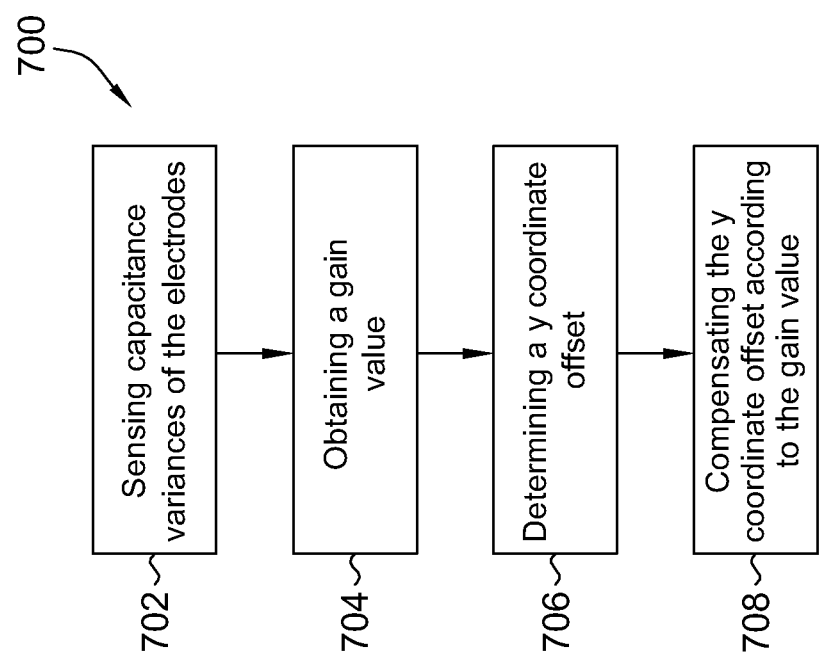

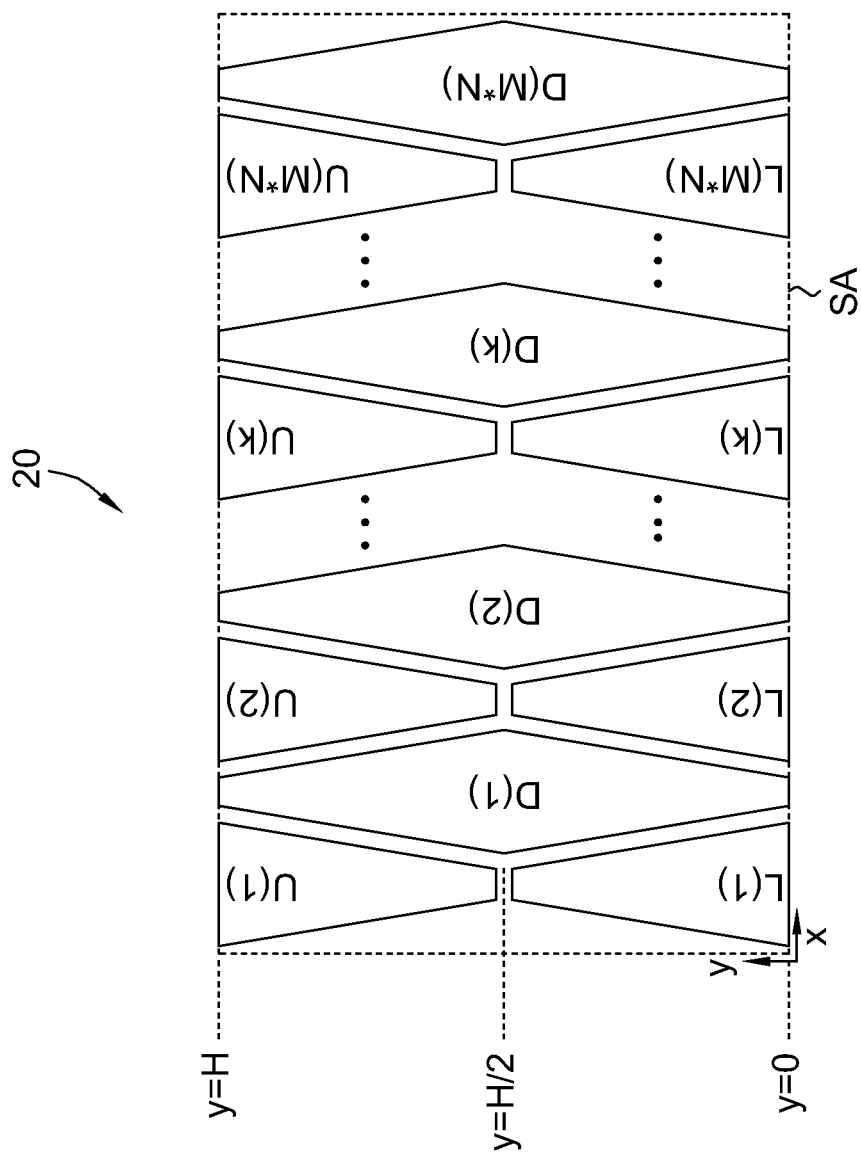

TOUCH DISPLAY PANEL AND ASSOCIATED METHOD

CROSS REFERENCE TO RELATED PATENT APPLICATION

This patent application is based on Taiwan, R.O.C. patent application No. 099102683 filed on Jan. 29, 2010.

FIELD OF THE INVENTION

The present invention relates to a touch display panel integrated with a touch sensor and associated method, and more particularly, to a touch display panel integrated with a touch sensor by forming a touch sensor conductive layer via a conductive layer of a display panel and associated method.

BACKGROUND OF THE INVENTION

A touch screen, combining a touch sensing function of a touch sensor to a display function of a display panel and providing a kind and intuitive operating interface to users, has become one of the most popular man-machine interfaces in modern society. Realizing a touch screen having perfect performance at low cost becomes an emphasis of research for modern information manufacturers.

SUMMARY OF THE INVENTION

A capacitive touch sensor senses a capacitance variation caused by a touch of a user by defining a plurality of electrodes in a sensing area, and thus calculating/analyzing a touched position. In the touch sensor, a resolution and accuracy of the touched position are associated with cost. To increase the resolution of the touched position, electrodes insulated from each other are defined in the sensing area, capacitance variations of the electrodes are separately sensed to resolve the touched position. However, for this technique, the touch sensor (and associated circuits) needs a large amount of pins to support the increased electrodes, thereby substantially increasing cost of the touch sensing mechanism. For another technique, electrodes arranged along different directions in two conductive layers are adopted to calculate the resolution of the touch sensing. However, this technique not only requires more pins, but also requires another conductive layer, and thus cost is higher thereby reducing a yield rate due to increase of the conductive layer.

Therefore, one object of the present invention is to provide a preferred a capacitive touch sensor with a single-conductive layer, which provides enhanced resolution using a small number of pins. According to an embodiment of the present invention, a touch sensor defines in an x direction (i.e., regarded as a horizontal direction) of a sensing area a plurality of sensor groups that are insulated from each other. Each of the sensing groups is further divided into a plurality of first electrodes, a plurality of second electrodes and a plurality of third electrodes. The first electrodes, the second electrodes and the third electrodes are defined in a same conductive layer, and are insulated from each other (i.e., currents do not flow between each other). Each of the sensing groups comprises a first line, a second line and a third line. The first line coupled to the plurality of first electrodes of each of the sensing groups conducts the first electrodes (i.e., current flows between the first electrodes). Likewise, the second line is coupled to the plurality of second electrodes of each of the sensing groups, and the third line is coupled to the plurality of third electrodes of the each of the sensing groups.

In the foregoing touch sensor, the first electrodes, the second electrodes and the third electrodes are extended along a y direction (i.e., regarded as a vertical direction) of the sensing area, and each of the first electrodes/the second electrodes and each of third electrodes are interlace along the x direction, such that each of the first electrodes/the second electrodes are adjacent to the each of the third electrodes. In an embodiment, each of the first electrodes and a corresponding second electrode are respectively located on two sides of a symmetry axis in the x direction, and the positions of the two electrodes are symmetric with each other along the symmetry axis, with an insulation gap in the middle to separate the two electrodes. In contrast, the third electrodes cross the two sides of the symmetry axis in the y direction, and position of the third electrodes are symmetric along the symmetry axis. Supposing $y=0$ and $y=H$ (H is a constant value) are for defining a lower boundary and an upper boundary of the sensing area in the y direction, the foregoing symmetry axis corresponds to $y=H/2$, the first electrodes and the corresponding second electrodes respectively extend within two ranges from $y=H/2$ to $y=H$ and from $y=0$ to $y=H/2$, and the third electrodes extend within a range from $y=0$ to $y=H$.

For the resolution in the x direction, since each of the sensing groups arranged in the x direction is divided into the first electrodes, the second electrodes and the third electrodes, sensing errors of the touched position in the x direction are accordingly removed. In addition, although each of the sensing groups comprises the first electrodes, the second electrodes and the third electrodes, with the first electrode being mutually coupled, only one pin is needed; likewise, the second electrodes of a same sensing group only needs one pin, and the third electrodes of a same sensing group only needs one pin. Therefore, a sensing group only needs three pins.

For the resolution in the y direction, the sensing area is divided to two ranges from $y=H/2$ to $y=H$ and from $y=0$ to $y=H/2$, touch positions having different y coordinates are coupled to different capacitance variances by using forms of the first electrodes, the second electrodes and the third electrodes, so as to increase the resolution in the y direction. For example, section sizes of the first and second electrodes in the x direction are changed in different y coordinates according to variations in the y direction. In contrast, in a corresponding adjacent part of the third electrodes and the first/second electrodes, section sizes in the x direction are inversely changed in the y direction. Since the third electrodes are symmetric with each other along a symmetry axis of $y=H/2$, section sizes of the third electrodes in the x direction are changed in the y direction, and achieves extreme values (e.g., a maximum value or a minimum value in the symmetry axis). Since the first electrodes and the second electrodes are divided in the y direction, when a y coordinate of the touched position is calculated, a weight average is performed within two ranges from $y=H/2$ to $y=H$ and from $y=0$ to $y=H/2$, so as to increase the resolution in the y direction. Due to assistance of forms of the electrodes, even if only three pins are used for outputting in a same sensing group, the y coordinate of the touched position is accurately determined according to the present disclosure.

Another object of the present invention is to provide a sensing touch method applied to the foregoing touch sensor. The sensing touch method comprises sensing a capacitance variance of each of the first electrodes to obtain a first variance; sensing a capacitance variance of each of the second electrodes to obtain a second variance; sensing a capacitance variance of each of the third electrodes to obtain a third variance; and obtaining a gain value according to a difference between the first variance and the second variance. When the y coordinate of the touched position is calculated, the y coordinate is compensated according to the gain value, and a difference between the y coordinate and a reference coordinate is used to determine the y coordinate of the touched position. For that there is an insulation gap for insulating each of the first electrodes and the corresponding second electrodes, the insulation gap may incur errors when the y coordinate of the touched position is calculated. The foregoing gain value is for reducing the errors caused by the insulation gap, and becomes smaller as the difference between the first variance and the second variance gets smaller. More specifically, the gain value conforms to the following conditions. When the first variance approaches the second variance, the gain value approaches zero; when the difference between the first variance and the second variance gets larger, the gain value approaches a constant value.

When the y coordinate of the touched position is calculated, a coordinate offset is determined according to the first variance, the second variance and the third variance, and a difference between the y coordinate of the touched position and a reference coordinate is determined according to a product of the coordinate offset and the gain value. For example, the reference coordinate is y=H/2.

As mentioned above, a touch sensor having a small number of pins and a high resolution is realized using a single conductive layer. Since only one single conductive layer is implemented, the touch sensor provided by the present invention is conveniently integrated with a display panel. In current technology, the touch sensor and the display panel are respectively manufactured by different manufacturers via different fabrications, and are then combined together to form a touch screen. Accordingly, cost and time for manufacture, fabrication and assembly are increased, and popularity of the touch screen is not facilitated. Compared to the prior art, according to the present disclosure, a conductive layer of the touch sensor and a pixel electrode conductive layer of the display panel are integrated to a touch display panel via a same fabrication. Therefore, after the display panel has been fabricated, a touch sensing function is already built into it to reduce manufacture cost and time of the touch screen.

Yet another object of the present invention is to provide a touch display panel integrating a touch sensor, and the touch display panel comprises a first polarizer, a top glass substrate, a first conductive layer, a color filter, a second conductive layer, a display unit structure, a bottom glass substrate, and a second polarizer. The first polarizer passes light in a first polarization direction, and the second polarizer passes light in a second polarization direction. The first polarization direction is similar to or the same as the second polarization direction. The first conductive layer comprises a plurality of electrodes for transmitting an electronic signal in response to a touch on the display panel. The second conductive layer comprises a plurality of pixel electrodes of the display panel. The display unit structure forms a plurality of display units. The color filter displays a plurality of colors on different display units.

In an embodiment, the first conductive layer for transmitting a common voltage divides electrodes according to a plurality of insulation gaps. In another embodiment, a third conductive layer, defined between the first conductive layer and the second conductive layer, transmits the common voltage. In yet another embodiment, the third conductive layer divides a plurality of electrodes according to a plurality of insulation gaps, and calculates a resolution of a touched position by being associated with the electrodes of the first conductive layer to realize a touch sensor with electrodes of two conductive layers. In still another embodiment, the third conductive layer does not comprise insulation gaps, and a fourth conductive layer with electrodes is associated with the electrodes of the first conductive layer to realize the touch sensor with the two conductive layers.

Still another object of the present invention is to provide a method for manufacturing the foregoing touch display panel. The method comprises forming a first conductive layer via a conductor fabrication and defining a plurality of electrodes insulated from each other on a top glass substrate; and forming a color filter, forming a second conductive layer and defining pixel electrodes via the conductor fabrication on a bottom glass substrate. In addition, a third conductive layer and a fourth conductive layer are formed between the first conductive layer and the second conductive layer via a predetermined fabrication. When the first or the third conductive layer is formed, a plurality of electrodes are divided via a plurality of insulation gaps.

The advantages and spirit related to the present invention can be further understood via the following detailed description and drawings.

BRIEF DESCRIPTION OF THE DRAWINGS

FIG. 5 is a schematic diagram of a y coordinate of a touched position sensed by the touch sensor in FIG. 1 before a gain value is introduced, an actual y coordinate, and the gain value for compensation.

FIG. 6 is a schematic diagram of a situation that a sensed y coordinate of a touched position sensed by the touch sensor, in FIG. 1, compensated according to the gain value in FIG. 5, approximates an actual y coordinate.

FIG. 7 is a flow of calculation of a y coordinate of a touched position by the touch sensor in FIG. 1 in accordance with an embodiment of the present invention.

FIG. 8 is a schematic diagram of a touch sensor in accordance with another embodiment of the present invention.

DETAILED DESCRIPTION OF THE PREFERRED EMBODIMENT

Figure 1:
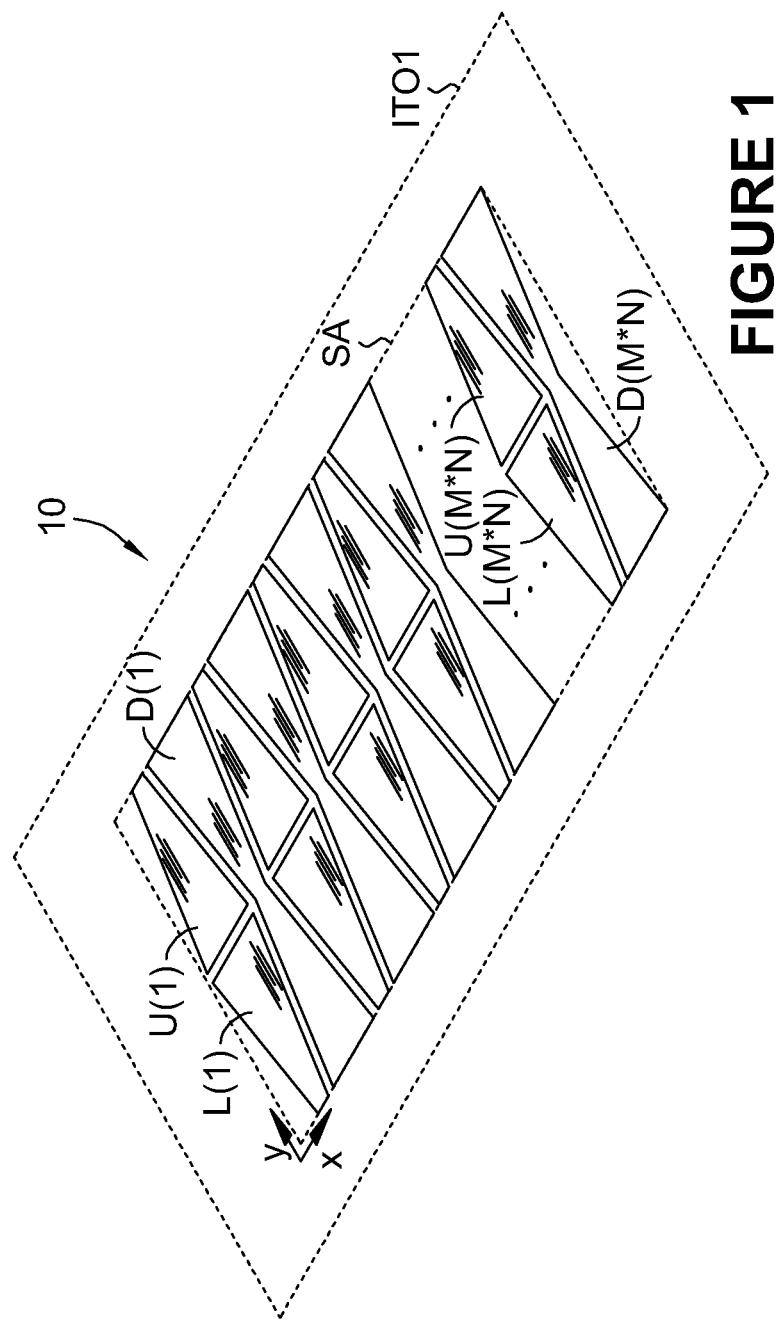
FIG. 1 is a schematic diagram of a touch sensor in accordance with an embodiment of the present invention.
Figure 2:
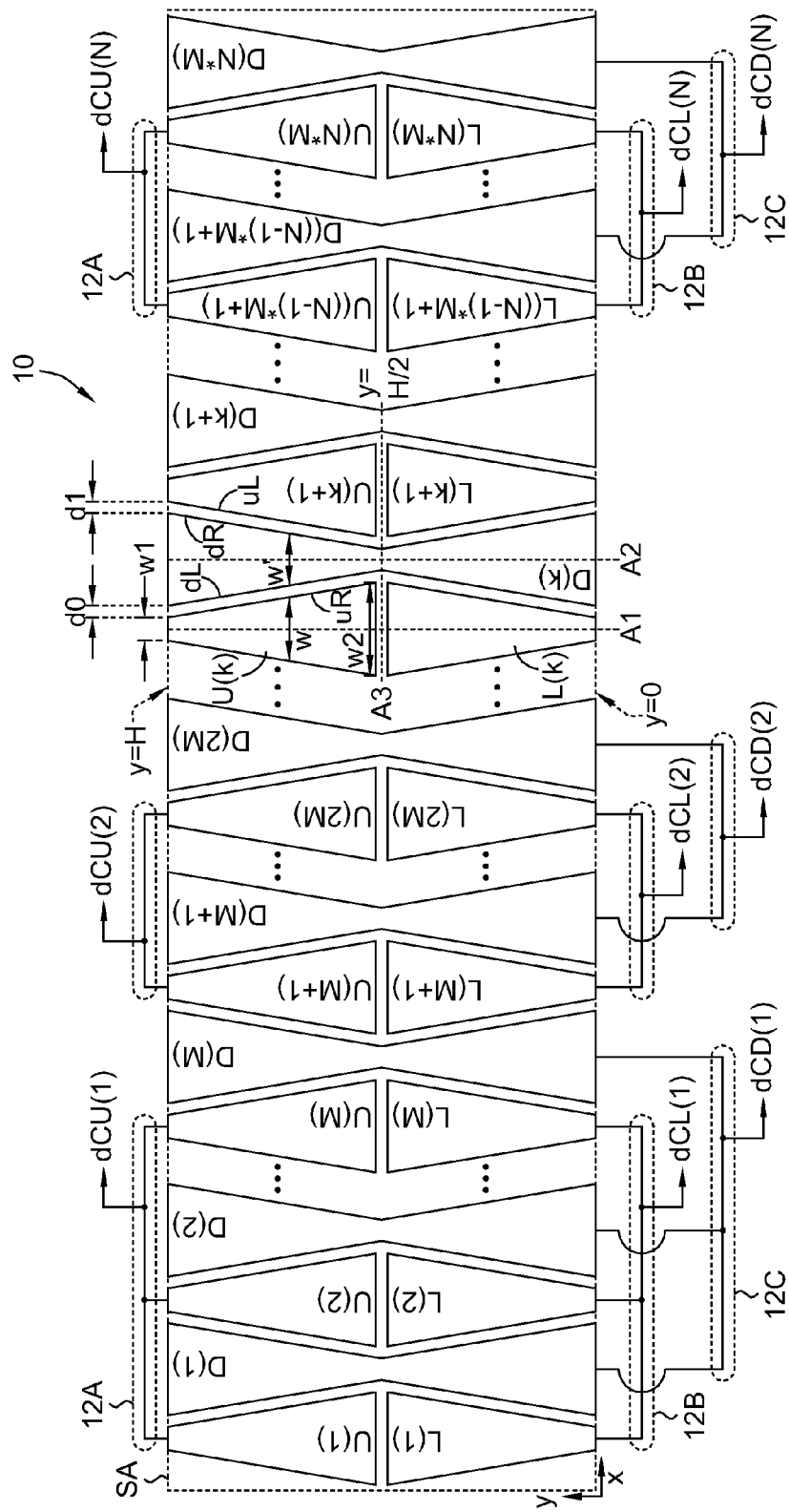
FIG. 2 is schematic diagram of a plane of the touch sensor in FIG. 1.

FIG. 1 and FIG. 2 are schematic diagrams of a touch sensor 10 in accordance with an embodiment of the present invention. Referring to FIG. 1, the touch sensor 10 is realized by a plurality of electrodes U(1) to U(M*N), a plurality electrodes L(1) to L(M*N), and a plurality of electrodes D(1) to D(M*N), where M and N are constant integers, M is greater than or equal to 1, and N is greater than 1. The electrodes are disposed in a sensing area SA of one conductive layer ITO1, which is an indium tin oxide (ITO) transparent conductive layer. In the sensing area SA, the electrodes are for coupling charges and capacitance variations caused by a touch of a user, and other structures (not shown) are adopted to insulate the outside of the sensing area SA from the touch of the user. When a touch screen is realized, the sensing area SA is regarded as a visible area, such that an image of the display panel is seen through the sensing area SA. Supposed that a xy plane is defined in the sensing area SA, then the touch sensor 10 is used to sense x coordinate position and y coordinate position where the touch is conducted within the range of the sensing area SA. FIG. 2 further illustrates allocations of the electrodes of the touch sensor 10 on the xy plane.

Referring to FIG. 2, the electrodes U(1) to U(M*N) have same forms, the electrodes L(1) to L(M*N) have same forms, and the electrodes D(1) to D(M*N) also have same forms. Taking an arbitrary kth electrode U(k), L(k) and D(k) as examples, where k can be from 1 to M*N, the electrodes U(k), L(k) and D(k) extend in y direction (i.e., regarded as a vertical direction) of the sensing area SA to form a finger shape. In FIG. 2, the electrode U(k) and the electrode L(k) corresponding to the electrode U(k) are respectively located at two sides of a symmetry axis A3 in an x direction, and have forms and positions being symmetric to each other along the symmetry axis A3, where an insulation gap is in the middle (along the symmetry axis A3) to separate the two electrodes. In addition, the electrode D(k) extends in the y direction across both sides of the symmetry axis A3, and has a axis-symmetric form about the symmetry axis A3. Supposing that y=0 and y=H are adopted to define a lower boundary and an upper boundary of the sensing area SA, then the symmetry axis A3 corresponds to y=H/2, the electrode U(k) extends within the range from y=H/2 to y=H, the electrode L(k) extends within the range from y=0 to y=H/2, and the electrode D(k) extends within the range from y=0 to y=H.

Based on the symmetry of the electrodes U(k) and L(k), the electrode U(k) is taken as an example to disclose arrangement, forms and relative relationships between the electrode U(k)/L(k) and the electrode D(k). Within the range from y=H/2 to y=H, the electrode U(k) and the electrode D(k) are interlaced in the x direction, so that the electrode U(k) is adjacent to the electrode D(k) in the x direction. Side edge uR of the electrode U(k) is parallel to side edge dL of the electrode D(k), and the distance between the two side edges is d0. Another side edge dR of the electrode D(k) is parallel to side edge uL of the next electrode U(k+1), and distance between the two side edges is d1 (d1 can equal or not equal the distance d0). In other words, the electrodes U(k), D(k) and U(k+1) are insulated from one another and are interlaced in the x direction. As shown in FIG. 2, section width w (i.e., a cross-section size) of the electrode U(k) in the x direction changes along the y direction, that means, at different y coordinate positions different section widths w present. In addition, within the range from y=H/2 to y=H, for part of the electrodes D(k) adjacent to the electrode U(k), electrode D(k)'s cross-section width w' in the x direction changes oppositely relative to U(k) along the y direction. In the embodiment of FIG. 2, section width w' of the electrode D(k) relatively increases (e.g., the section width is linearly increased) as the section width w of the electrode U(k) decreases from a width w2 to a width w1 (e.g., the section width w is linearly reduced). Since the electrode U(k) is symmetric about the symmetry axis A3 at y=H/2, the section width w of the electrode U(k) changes within the range from y=H to y=H/2 in the y direction, and achieves an extreme value on the symmetry axis A3 (e.g., the extreme value is a maximum value in FIG. 2). In addition, the electrode U(k) (or L(k)) itself is symmetric across the y direction (displaying an isosceles triangle form or a trapezoid form), and the electrode D(k) itself is symmetric across a symmetry axis A2 along the y direction. In another embodiment, the electrodes U(k)/L(k) do not need to have the isosceles triangle form or the trapezoid form. Likewise, the electrode D(k) itself does not need to be symmetric.

Out of the electrodes U(1) to U(M*N), electrodes L(1) to L(M*N) and electrodes D(1) to D(M*N), the first M number of electrodes U(1) to U(M), first M number of electrodes L(1) to L(M) and first M number of electrodes D(1) to D(M) form a sensing group. Within the sensing group, the electrodes U(1) to U(M) are coupled via a conductive line 12A to conduct currents among the electrodes U(1) to U(M), and an electrical signal dCU(1) responds to an overall capacitance variance among the electrodes U(1) to U(M). Likewise, the electrodes L(1) to L(M) are coupled via a conductive line 12B, so that a signal dCL(1) responds to a capacitance variance coupled among the electrodes L(1) to L(M). The electrodes D(1) to D(M) are coupled via a line 12C, so that a signal dCD(1) responds to a sensed capacitance variance among the electrodes D(1) to D(M).

According to similar structures, the next M number of electrodes U(M+1) to U(2M), L(M+1) to L(2M) and D(M+1) to D(2M) form a second sensing group to respectively provide signals dCU( ) dCL(2) and dCD(2). The last M number of electrodes U((N−1)*M+1) to U(N*M), L((N−1)*M+1) to L(N*M), and D((N−1)*M+1) to U(N*M) form the Nth sensing group, and respectively provide signals dCU(N), dCL(N) and dCD(N).

In other words, N number of sensing groups are defined in the x direction within the sensing area SA, and each of the sensing groups has M electrodes U(k), M electrodes L(k) and M electrodes D(k). Although each of the sensing groups comprises three types of electrodes U(k), L(k) and D(k), since electrodes of the same type are coupled together, only three pins are needed within each of the sensing groups to transmit three signals dCU(n), dCL(n) and dCD(n) (where n is equal to 1 to N).

When a sensing output of the touch sensor 10 is implemented to analyze the x coordinate of the position where the touch is conducted, a weighted average is obtained from x coordinate positions of the sensing groups and the signals dCU(n), dCL(n) and dCD(n) of the sensing groups to calculate the x coordinate position of the touched position. Because each of the sensing groups in the x direction further comprises M electrodes U(k), L(k) and D(k), sensing errors of the touched position in the x direction are reduced.

Figure 3:
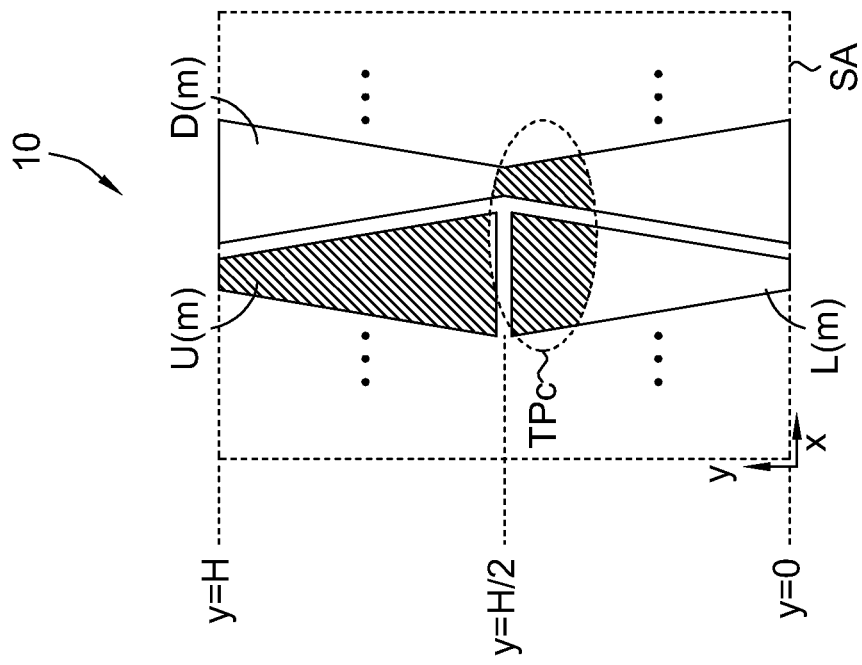
FIG. 3 and FIG. 4 are schematic diagrams of a situation that a y coordinate of a touched position is sensed by the touch sensor in FIG. 1.

An operating principle of the touch sensor illustrated in FIG. 3 is applied for analyzing y coordinate position of the touched position. Assume that when the touched positions are at TPa and TPb, the overlapped part of the touched position TPa and an electrode L(m) is smaller than that of the touched position TPb and the electrode L(m). As a result, a capacitance variance of the electrode L(m) at the touched position TPb is larger. In contrast, capacitance variance of the electrode D(m) at the touched position TPb is smaller. Regardless of the touched positions TPa and TPb, the capacitance variance of the electrode U(m) is fairly small (almost zero). Because the signals dCU(n), dCL(n) and dCD(n) are related to the capacitance variance, the y coordinate position of the touched position is determined by relative relationships among the signals dCU(n), dCL(n) and dCD(n) of the sensing groups. Because the electrodes U(k) and L(k) are located in the y direction, a weight average is generated within the range from y=H/2 to y=H and the range from y=0 to y=H/2 to determine the y coordinate position of the touched positions where the resolution in the y direction is improved. Due to the design of forms of the electrodes, the y coordinate of the touched position is accurately determined even if there are only three output pins in one sensing group.

Figure 4:
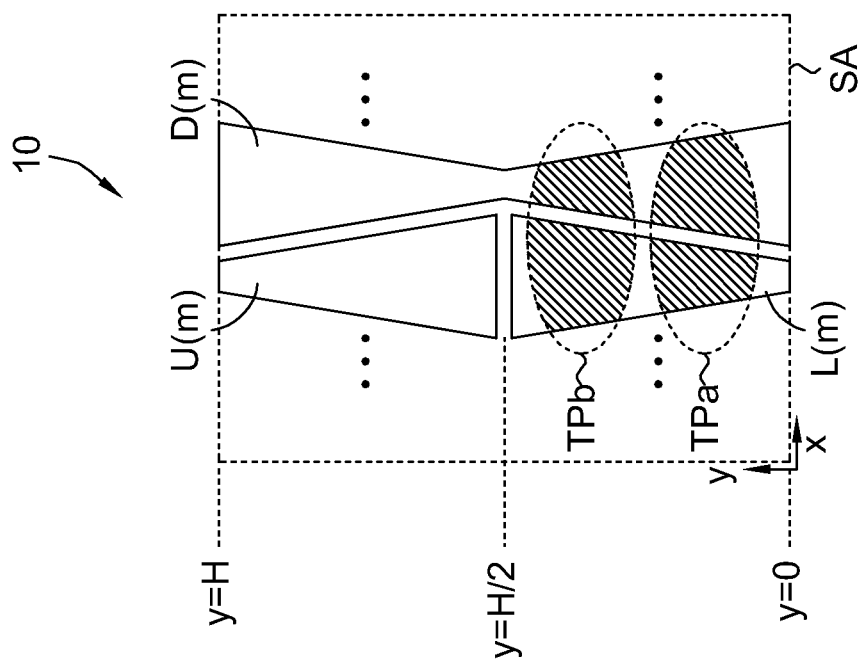

Since the insulation gap exists in between the electrodes U(k) and L(k), when the touched position is close to axis y=H/2, the insulation gap may easily incur errors of the y coordinate. Following description associated with such situation is given with reference to FIG. 4. When the touched position is located at TPc, since the insulation gap between the electrodes U(m) and L(m) reduces the effective electrode area of the touched position TPc, the capacitance variance of the electrodes U(m), L(m) and D(m) of the touched position TPc may not have significant differences compared to that of the touched position TPb (shown in FIG. 3) even if the y coordinate of the touched position TPc compared to that of the touched position is closer to y=H/2. The y coordinate errors caused by the insulation gap between the electrodes U(k) and L(k) are further illustrated in FIG. 5. A horizontal axis in FIG. 5 represents an actual y coordinate position of a touched position, and a vertical axis represents a y coordinate position determined according to a capacitance variance sensed by each electrode. Under ideal situations, the actual y coordinate position is the same as the sensed y coordinate position. However, as mentioned above, although touched positions TPb and TPc are at different y coordinate positions, resolution errors of the y coordinates occur since y coordinates of the touched positions TPb and TPc are close to each other and the existence of the insulation gap cause the slight difference not sensed by the system.

In this embodiment, in order to remove the foregoing errors, a gain compensation is introduced to compensate errors when the y coordinate of the touched position is analyzed. A gain value is calculated according to a difference between the capacitance variance of the electrode U(k) and that of the electrode L(k). FIG. 5 shows a schematic diagram of a gain value designed according to the present disclosure. When the capacitance variances of the electrode U(k) and L(k) are approximate to each other, it means that the y coordinate position of the touched position approximates y=H/2. At this point, the gain value approximates a constant value C0 (e.g., zero) to remove the errors incurred by the insulation gap. When there is a large difference between the capacitance variances of the electrodes U(k) and L(k), it means that the y coordinate position of the touched position is closer to y=H or y=0 rather than to y=H/2 where the insulation gap locates, so the gain value approximates another constant value C1 (e.g., 1) and no more correction is needed. When the y coordinate of the touched position is calculated, a y coordinate offset Dy is calculated according to the capacitance variances of the electrodes U(k), L(k) and D(k), and a difference between the y coordinate position of the touched position and a reference coordinate position is calculated according to a product of the y coordinate offset Dy and the gain value. In practice, the reference coordinate position is y=H/2 that represents the position of the insulation gap. That is, when the y coordinate position of the touched position is close to y=H/2, even if errors of the y coordinate offset Dy occur, the sensed y coordinate can still approximate the actual y coordinate since the gain value also decreases so that effect of the error in the y coordinate offset Dy is reduced. FIG. 6 shows a schematic diagram of the y coordinate position sensed at the touched position after compensation via the gain value. The compensated sensed y coordinate position accurately matches with the actual y coordinate position.

FIG. 7 shows a flow chart of a flow 700 of operations for determining a y coordinate position of a touched position by the touch sensor 10 in accordance with an embodiment of the present invention. The flow 700 is to be described below.

In Step 702, sensing a capacitance variance coupled between the electrodes U(k), a capacitance variance of the electrodes L(k) and a capacitance variance of the electrodes D(k) in each of the sensing groups is performed.

Step 704 includes calculating a difference between the capacitance variances of the electrodes U(k) and that of the electrode L(k) to obtain a gain value.

Step 706 includes determining a y coordinate offset according to the capacitance variances of the electrodes U(k), L(k) and D(k) of each of the sensing groups. The y coordinate offset represents an offset between the y coordinate position of the touched position and y=H/2. As discussed in the description of FIG. 5, errors occur in a sensed y coordinate position calculated according to the y coordinate offset due to the insulation gap between the electrodes U(k) and L(k).

In Step 708, compensating the y coordinate offset obtained in Step 706 according to a gain value to obtain a compensated y coordinate offset is performed. For example, the compensated y coordinate offset is determined according to a product of the y coordinate offset in Step 706 and the gain value in Step 704, and the y coordinate position of the touched position is determined according to the compensated y coordinate offset.

The steps in the flow 700 may be altered under certain situations. For example, a sequence of Step 704 and Step 706 may be exchanged, or Step 704 and Step 706 are simultaneously performed.

FIG. 8 shows a schematic diagram of a touch sensor 20 in accordance with another embodiment of the present invention. Similar to the touch sensor 10 in FIG. 2, the touch sensor 20 in FIG. 8 comprises a number of M*N electrodes, U(1) to U(M*N), L(1) to L(M*N) and D(1) to D(M*N), which form N sensing groups each comprising M electrodes U(k), L(k) and D(k). In this embodiment, forms of the electrodes U(k), L(k) and D(k) are different from those in FIG. 2. For example, the electrodes D(k) in FIG. 8 having section widths that achieve a maximum value at y=H/2. Operations and the principle of the touch sensor 20 are similar to those of the touch sensor 10, and shall not be described for brevity.

Figure 9:
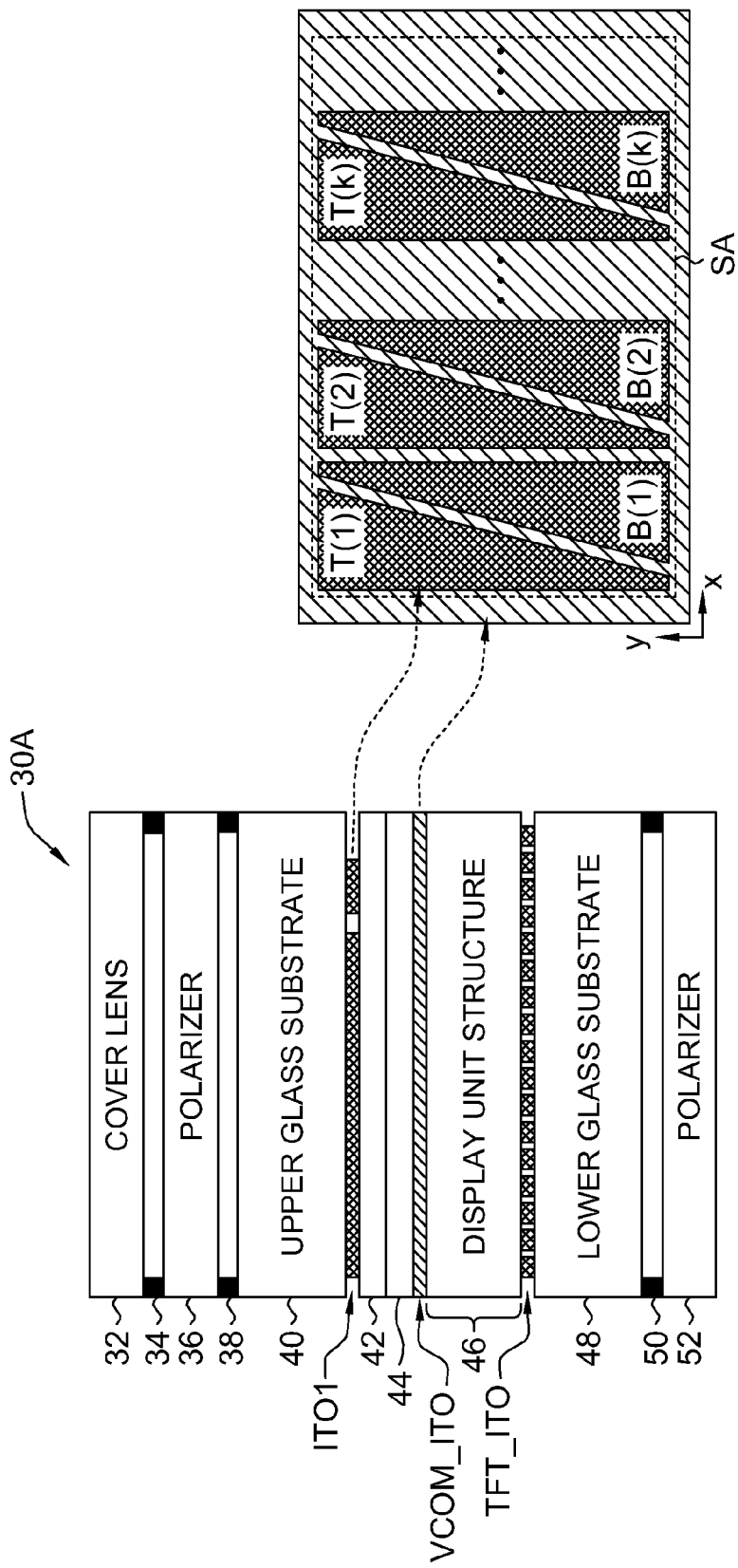
FIG. 9 to FIG. 14 are schematic diagrams of a display panel in accordance with an embodiment of the present invention.

According to the present disclosure, a low-cost high-resolution touch sensor is fabricated via electrodes with a single conductive layer, and the touch sensor is further integrated with a display panel to a touch display panel. When the touch display panel provided by the present invention completes, electrodes of the touch sensor are already built inside the touch display panel to directly realize functions of a touch screen. FIG. 9 shows a section structure for illustrating a touch display panel 30A in accordance with an embodiment of the present invention. The touch display panel 30A may be a liquid crystal display (LCD) panel. The touch display panel 30A comprises a cover lens 32, a glue layer 34, a polarizer 36, a glue layer 38, a top glass substrate 40, a conductive layer ITO1, an overcoat 42, a color filter 44, a conductive layer VCOM_ITO, a display unit structure 46, a conductive layer TFT_ITO, a lower glass substrate 48, a glue layer 50 and a polarizer 52. The cover lens 32 is made of glass or Polymethylmethacrylate (PMMA). The polarizer 36 passes lights in a first polarization direction, and the polarizer 52 passes lights in a second polarization direction, which is the same as or different from the first polarization direction. The glue layer 34 is for gluing the cover lens 32 and the polarizer 36, and the glue layer 38 is for gluing the polarizer 36 to one side of the top glass substrate 40. The conductive layer ITO1 of the touch sensor provided by the present invention is realized on the other side of the top glass substrate 40, and is an ITO transparent conductive layer.

Electrodes U(k), L(k) and D(k) are defined in the conductive layer ITO1 according to the embodiment in FIG. 2 or FIG. 8 to realize the touch sensor 10 or 20. In addition, the right part of FIG. 9 shows a plane diagram of electrodes of a touch sensor in accordance with an embodiment of the present invention. In FIG. 9, a sensing area SA having an xy plane is defined in the conductive layer ITO1, and a plurality of electrodes T(1) to T(k) with same forms and a plurality of electrodes B(1) to B(k) with same forms are defined in the sensing area SA. The electrodes T(k) and B(k) are insulated from one another, and extend in a y direction in finger shape and are interlaced in the x direction. In order to provide a resolution in the y direction, cross-section sizes (i.e., width) of the electrodes T(k) in the x direction change along the y direction, and cross-section sizes of the electrodes B(k) in the x direction change along the y direction in a opposite fashion relative to the electrodes T(k). For example, section widths of the electrodes T(k) in the x direction are increased from a minimum value to a maximum value along a positive y (+y) direction. Relatively, section widths of the electrodes B(k) in the x direction are decreased from a maximum value to a minimum value along the positive y (+y) direction.

Similar to the sensing groups in FIG. 2 and FIG. 8, M*N number of electrodes T(k) and M*N number of electrodes B(k) are defined into N sensing groups each comprising M electrodes T(k) and M electrodes B(k) in FIG. 9. The M electrodes T(k) coupled to each other via lines provide a corresponding signal in response to an overall capacitance variance of the electrodes T(k) coupling together, and the M electrodes B(k) coupled to each other via lines provide a corresponding signal in response to an overall capacitance variance of the electrodes B(k) coupling together. According to the two signals provided by each sensing group, the touch sensor realized in the conductive layer ITO1 determines the touched position in x coordinate and y coordinate.

The overcoat 42 in the conductive layer ITO1 protects the conductive layer ITO1, and comprises an insulation layer (not shown). The conductive layer VCOM_ITO under the color filter 44 transmits/maintains a common voltage, and is an electrode extending to a whole plane as shown in the right part of FIG. 9. The conductive layer ITO1 and the conductive layer VCOM_ITO may be manufactured by same process and materials, i.e., process of the conductive layer ITO1 may be directly integrated to a manufacture process of a display panel.

A sealant, a spacer and an LCD are disposed in the display unit structure 46 to form a plurality of display units. Pixel electrodes arranged in matrix are defined in the conductive layer TFT_ITO, and each of the pixel electrodes corresponds to a display unit. Each pixel electrode is for transmitting driving power (a driving voltage) under the control of a thin film transistor (TFT) (not shown in FIG. 9) to drive the display units of the display panel with the common voltage of the conductive layer VCOM_ITO. The color filter 44 removes different color lights, so that different display units display a plurality of different colors. For example, certain display units display red, certain display units display green, and certain display units display blue. The glue layer 50 adheres the polarizer 52 to the other side of the top glass substrate 48.

Figure 10:
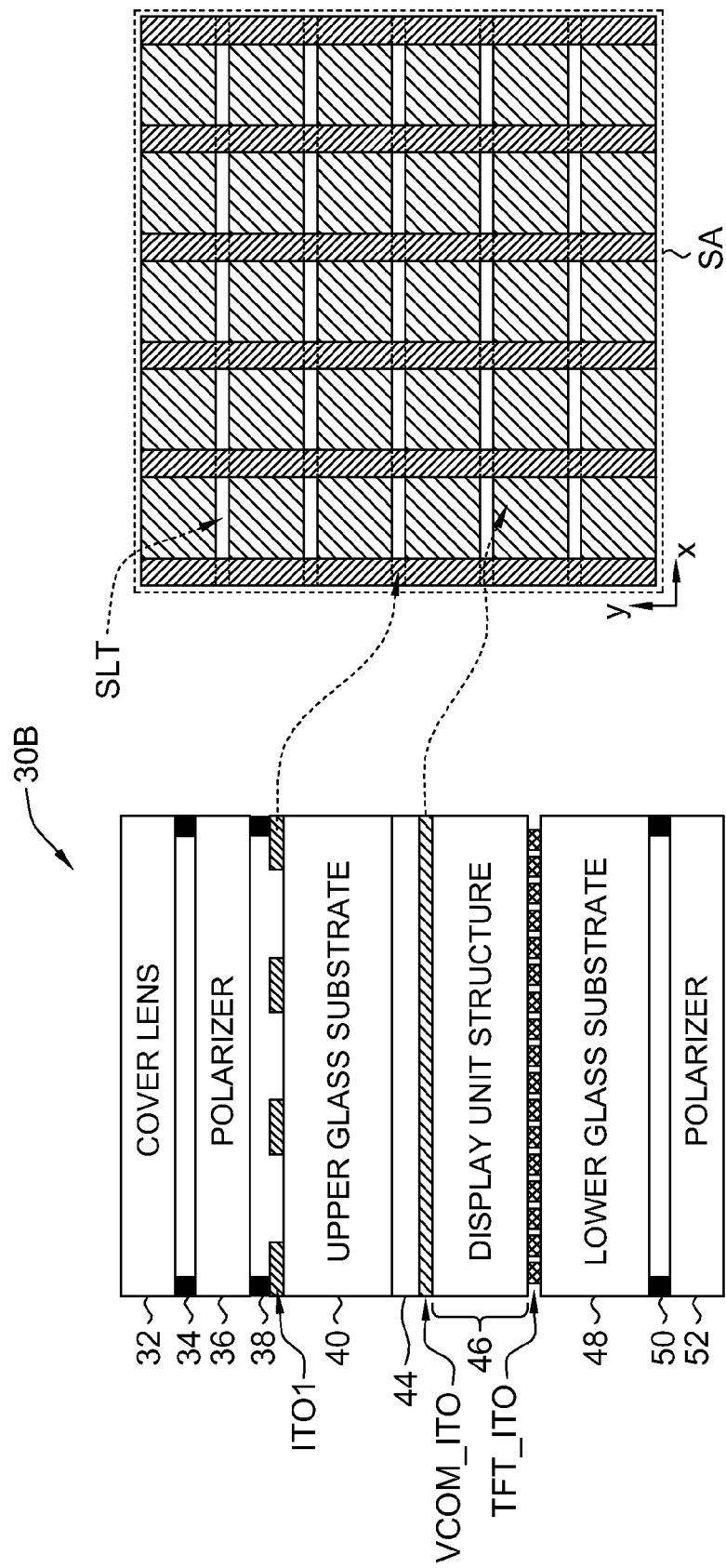

FIG. 10 shows a section structure for illustrating a touch display panel 30B in accordance with another embodiment of the present invention. The touch display panel 30B also comprises the cover lens 32, the glue layer 34, the polarizer 36, the glue layer 38, the conductive layer ITO1, the upper glass substrate 40, the color filter 44, the conductive layer VCOM_ITO, the display unit structure 46, the conductive layer TFT_ITO, the lower glass substrate 48, the glue layer 50, and the polarizer 52. A difference between embodiments in FIG. 9 and FIG. 10 is that, the conductive layer ITO1 for realizing a touch sensor and the conductive layer VCOM_ITO for transmitting a common voltage in the touch display panel 30B in FIG. 10 are respectively disposed on two opposite sides of the top glass substrate 40, and the glue layer 38 in FIG. 10 protects the conductive layer ITO and glues the polarizer 36. In addition, referring to the right part of FIG. 10, not only a plurality of stripe shaped electrodes insulated from each other are defined in the conductive layer ITO1, but also the conductive layer VCOM_ITO is defined by slender insulation gaps SLT into a plurality of horizontal stripe electrodes. In this embodiment, the conductive layer VCOM_ITO not only maintains a common voltage for driving a display unit, but also realizes a two-layer touch sensor together with the electrodes of the conductive layer. Accuracy of sensing the touch by the touch sensor is achieved by the interlaced electrodes of the two conductive layers. In order to maintain integrity of transmitting the common voltage by the conductive layer VCOM_ITO, a width of the insulation gap is maintained in an appropriate range.

Figure 11:
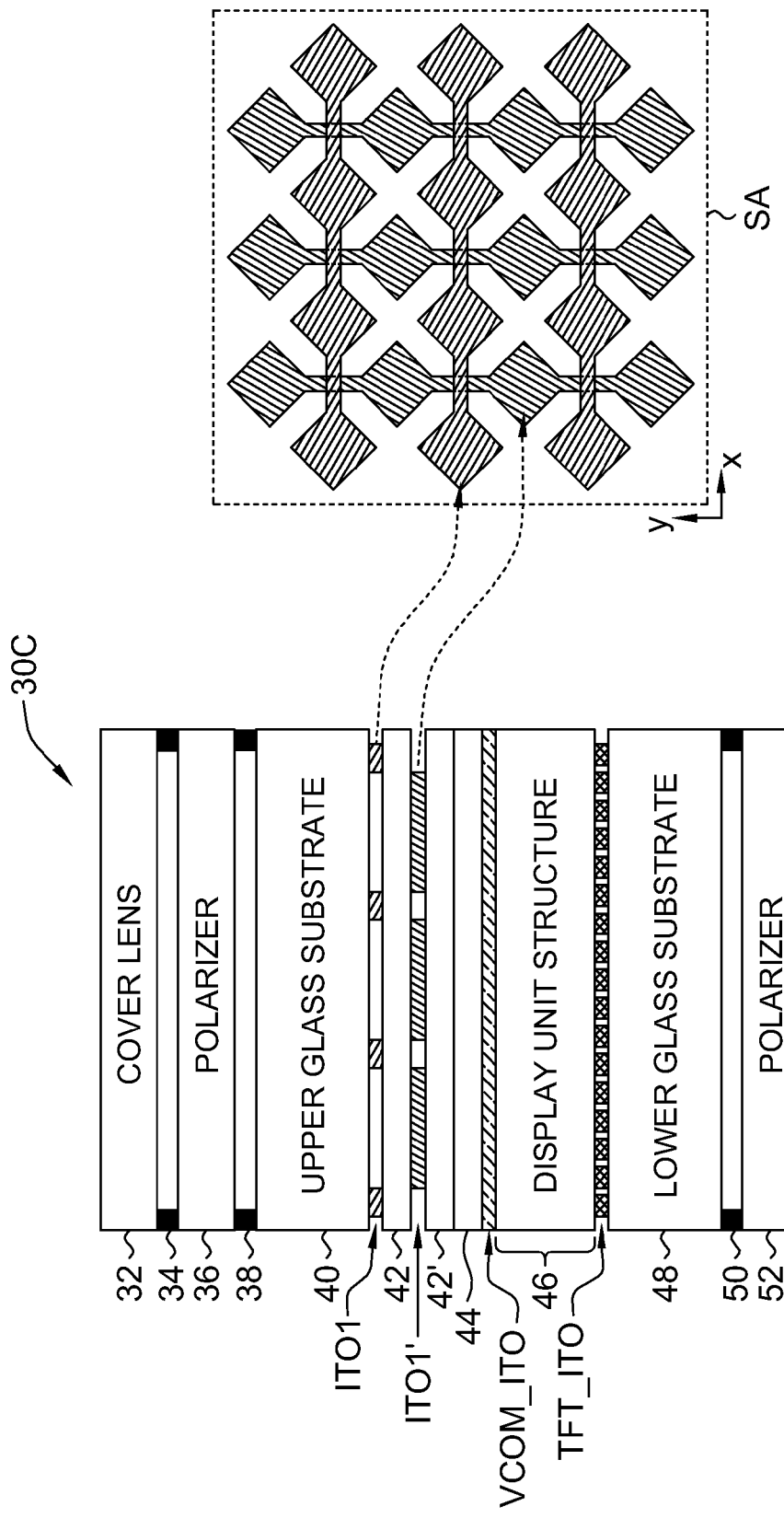

FIG. 11 shows a cross-section view for illustrating a touch display panel 30C in accordance with yet another embodiment of the present invention. The touch display panel 30C is similar to the touch display panel 30A in FIG. 9; however, in the touch display panel 30C, a conductive layer ITO1' and an overcoat 42' are disposed between the overcoat 42 and the color filter 44. The conductive layers ITO1 and ITO1' structure a dual-conductive layer touch sensor. Referring to the right part of FIG. 11, a plurality of stripe electrodes extending along an x axis are defined in the conductive layer ITO1, and a plurality of stripe electrodes extending along a y axis are defined in the conductive layer ITO1'.

Figure 12:
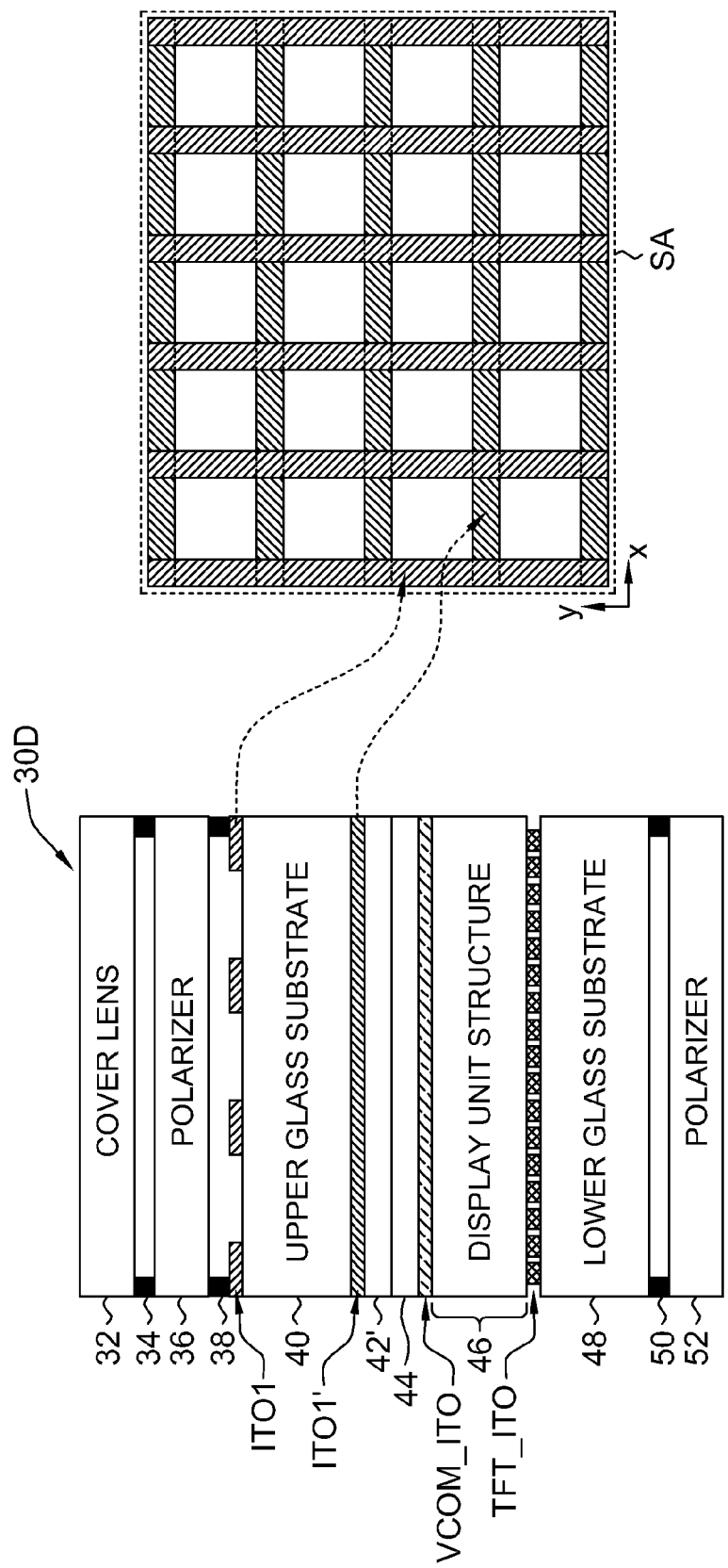

FIG. 12 shows a touch display panel 30D in accordance with still another embodiment of the present invention. The touch display panel 30D is similar to the touch display panel 30B in FIG. 10; however, in the touch display panel 30D, a conductive layer ITO1' and an overcoat 42' are additionally disposed between the top glass substrate 40 and the color filter 44. The conductive layers ITO1 and ITO1' structure a dual-conductive layer touch sensor. Referring to the right part of FIG. 12, a plurality of stripe electrodes extending along a y axis are defined in the conductive layer ITO1, and a plurality of stripe electrodes extending along an x axis are defined in the conductive layer ITO1'. In this embodiment, since the conductive layers ITO1' and ITO1 can realize the touch sensor, the conductive layer VCOM_ITO maintains as an electrode that is extended to a whole plane without being divided into different electrodes.

Figure 13:
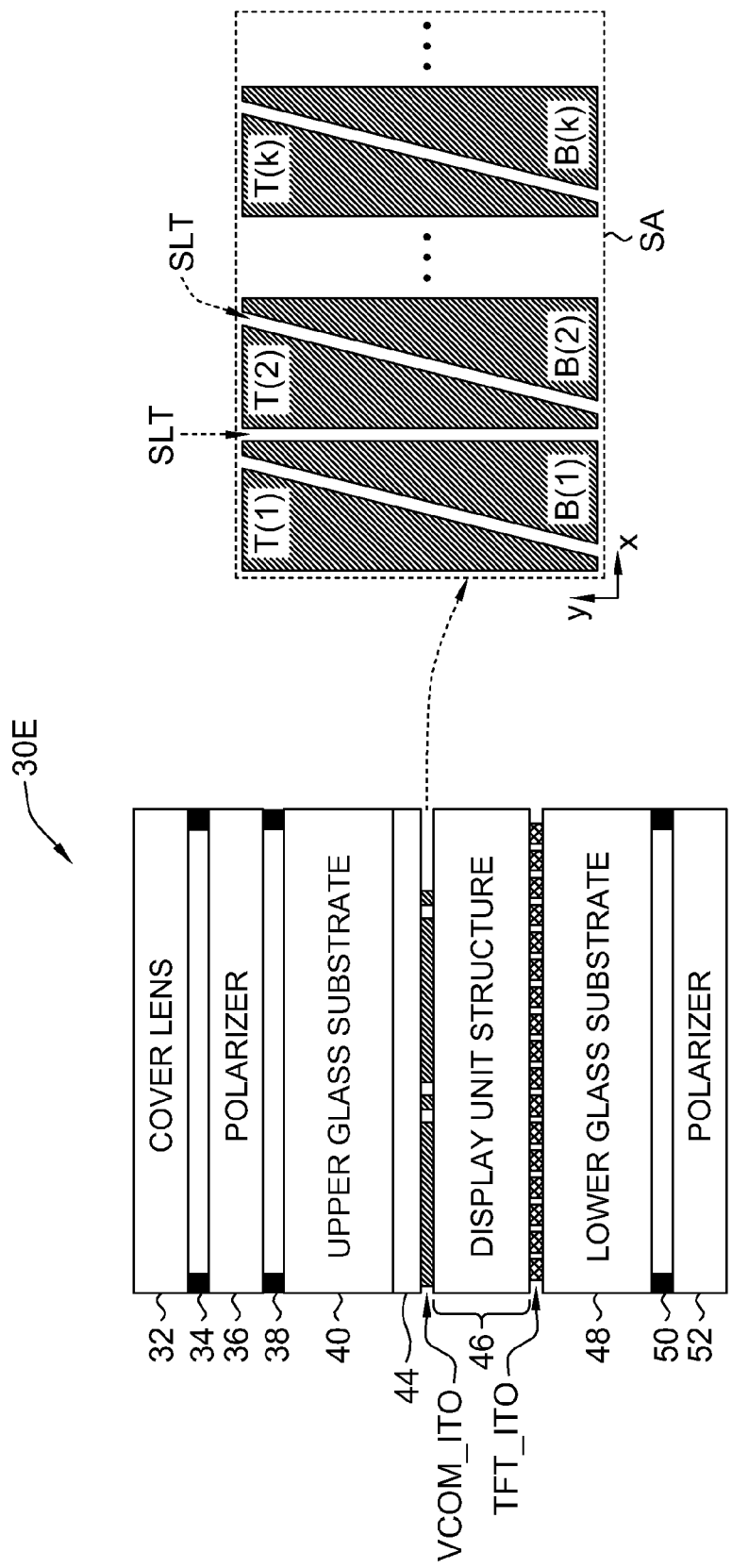

FIG. 13 shows a touch display panel 30E in accordance with still another embodiment of the present invention. The touch display panel 30E is similar to the touch display panel 30B in FIG. 10; however, in the touch display panel 30E, the conductive layer ITO1 between the glue layer 38 and the upper glass substrate 40 is omitted. Referring to the right part of FIG. 13, the conductive layer VCOM_ITO realize a single-conductive layer touch sensor by insulating the conductive layer VCOM_ITO to electrodes T(1) to T(k) and B(1) to B(k) via each insulation gap. In addition, such structure may also be adopted to realize the touch display panel in the embodiments in FIG. 2 and FIG. 8.

Figure 14:
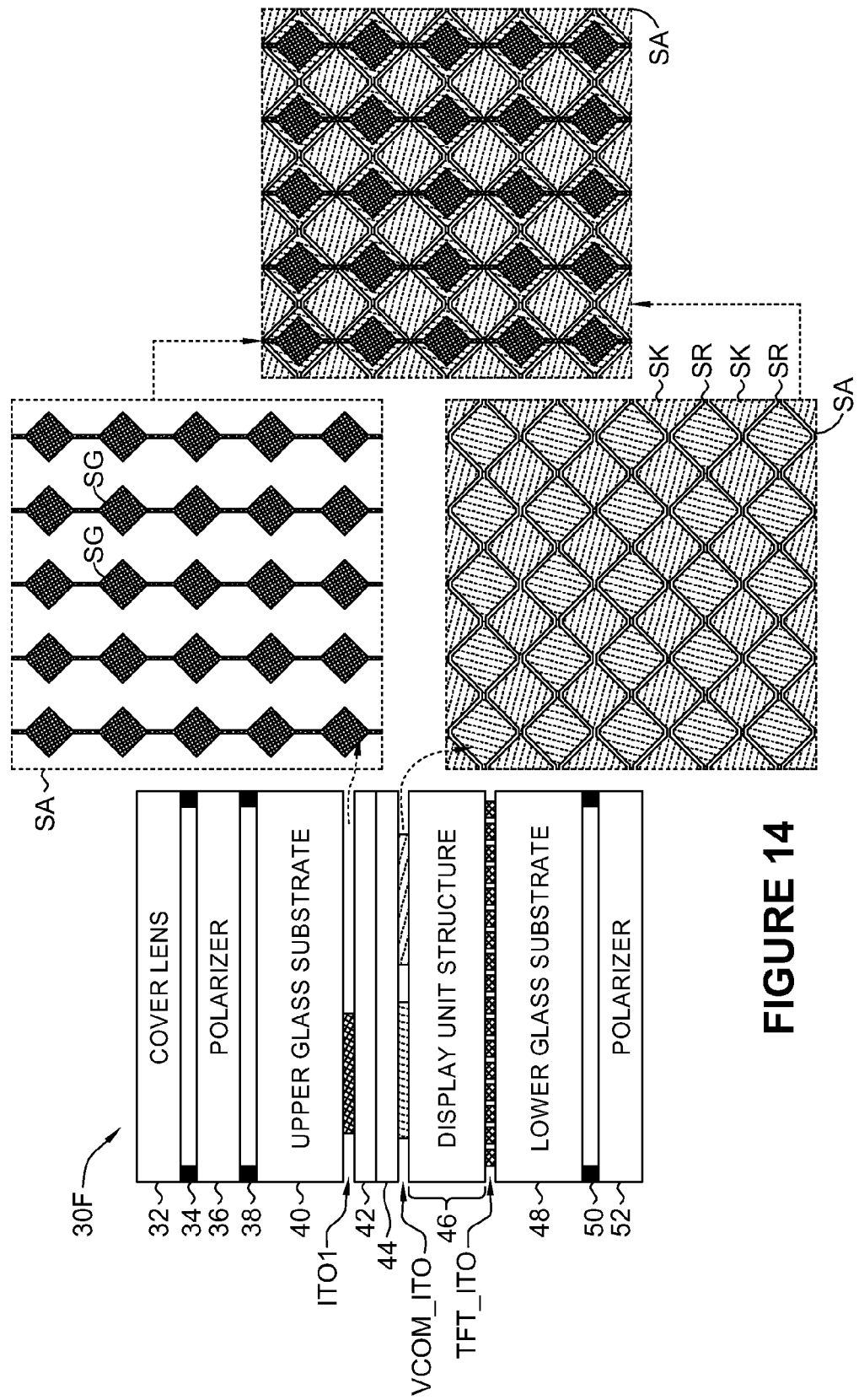

FIG. 14 shows a touch display panel 30F in accordance with still another embodiment of the present invention. The touch display panel 30F is similar to the touch display panel 30A in FIG. 9; however, in the touch display panel 30F, the conductive layer VCOM_ITO for transmitting a common voltage is divided into adjacent-interlaced electrodes SR and SK, and a plurality of electrodes SG are defined in the conductive layer ITO1. In the touch display panel 30F, when a touch position is sensed, mutual capacitances between the electrodes SG and electrodes SK are implemented to position the touched position. The electrodes SK also transmits the common voltage, and the electrodes SR maintains at a constant voltage to drive pixels and substantially reduce background capacitances. Preferably, insulation gaps for dividing electrodes in the conductive layer VCOM_ITO can conceal non-light-transmission parts of the display panel (e.g., parts for forming a black matrix), i.e., positions of the insulation gaps and plane projections of the non-light-transmission parts of the display panel are overlapped. In this embodiment, patterns of the electrodes SG in the conductive layer ITO1 and those of the electrodes SR in the conductive layer VCOM_ITO are overlapped. Plane projections of rhombus parts of the electrodes SG are covered by those of rhombus parts of the electrodes SR.

Figure 15:
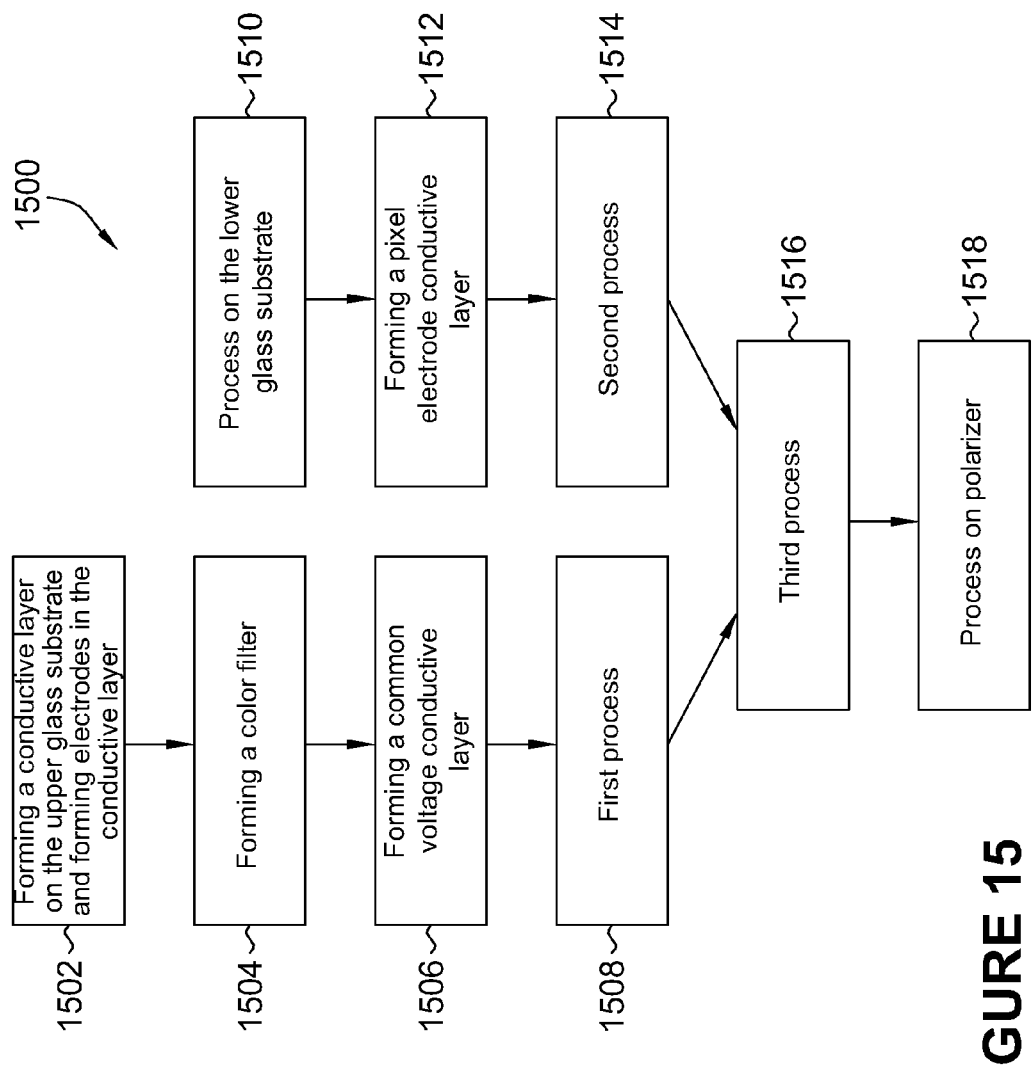
FIG. 15 is a flow chart of a flow for manufacturing a display panel in accordance with an embodiment of the present invention.

FIG. 15 shows a flow chart of a flow 1500 for manufacturing a touch display panel in accordance with an embodiment of the present invention. The flow 1500 mainly comprises the steps detailed below. In Step 1502, a conductive layer ITO1 is formed on an upper glass substrate 40, and electrodes are formed in the conductive layer ITO1 as a basis of a touch sensor according to the present disclosure. In addition, an overcoat 42 is formed to protect electrodes in the conductive layer ITO1. Similar to embodiments illustrated in FIG. 11 and FIG. 12, another conductive layer ITO1' with electrodes is formed via the foregoing conductor fabrication, and an associated overcoat 42' is also formed. In Step 1502, electrodes of a touch sensor are also formed in a display panel. In addition, the associated conductor manufacture process of the conductive layer ITO1 is omitted to realize the touch display panel 30E in FIG. 13. In Step 1504, a color filter 44 is formed. In Step 1506, a common-voltage conductive layer VCOM_ITO is formed via the foregoing process. Electrodes are divided in the conductive layer VCOM_ITO to realize the touch display panels in FIG. 13 and FIG. 14. In Step 1508, a part of structures is formed, e.g., rubbing film/rubbing process, sealant printing, and the like. In Step 1510, TFTs for controlling display units are formed on a lower glass substrate 48. In Step 1512, a conductive layer TFT_ITO is formed via the foregoing conductor fabrication, and pixel electrodes are divided for the display units. In Step 1514, a part of the display unit structure 46 is formed, e.g., rubbing film/rubbing fabrication, sealant printing, and the like. In Step 1516, an associated fabrication comprising integrating products of Step 1508 and Step 1514, injecting liquid crystals and dividing a panel is performed. In Step 1518, the polarizers 36 and 52 are glued to complete manufacture of the display panel.

In conclusion, compared to the prior art, a touch sensor provided by the present invention is realized by a single conductive layer or two conductive layers, and is capable of improving signal quality and a sensing resolution of a touched position via limited pins. The touch sensor provided by the present invention is low-cost integrated to fabrication of a display panel to build the touch sensor inside the display panel via a conductor fabrication of the display panel.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch display panel, comprising:
    a first polarizer, for passing light in a first polarization direction;
    a second polarizer, for passing light in a second polarization direction;
    a first conductive layer, disposed between the first polarizer and the second polarizer, the first conductive layer comprising a plurality of electrodes that are insulated from one another, wherein the plurality of electrodes comprises a plurality of first electrodes, a plurality of second electrodes, and a plurality of third electrodes, and the first electrodes, the second electrodes, and the third electrodes are insulated from each other, the first electrodes and the second electrodes are interlaced in a first direction, at least two of the first electrodes are coupled to each other to form a sensing group, and at least two of the third electrodes are coupled to each other to form another sensing group;
    a display unit structure, disposed between the first conductive layer and the second polarizer, the display unit structure comprising a plurality of display units; and
    a second conductive layer, disposed between the display unit structure and the second polarizer, the second conductive layer comprising a plurality of pixel electrodes.

2. The touch display panel as claimed in claim 1, further comprising:
    a color filter, defined between the first polarizer and the second conductive layer, for displaying a plurality of colors on the display units of the touch display panel.

3. The touch display panel as claimed in claim 1, wherein a cross section size of each of the first electrodes in the first direction changes along a second direction, and a cross section size of each of the second electrodes in the first direction changes along the second direction inversely relative to the first electrode, wherein the second direction is perpendicular to the first direction.

4. The touch display panel as claimed in claim 1, wherein the first conductive layer transmits a common voltage, the first conductive layer comprising a plurality of insulation gaps that divide the first conductive layer into the electrodes.

5. The touch display panel as claimed in claim 1, further comprising a third conductive layer, defined between the first conductive layer and the second conductive layer, for transmitting a common voltage.

6. The touch display panel as claimed in claim 5, further comprising a fourth conductive layer, disposed between the first conductive layer and the first polarizer, the fourth conductive layer comprising a plurality of electrodes that are insulated from one another, the electrodes transmitting an electrical signal in response to a touch on the touch display panel.

7. The touch display panel as claimed in claim 5, wherein the third conductive layer comprises a plurality of insulation gaps that divide the third conductive layer into a plurality of electrodes.

8. The touch display panel as claimed in claim 7, wherein a pattern of the electrodes of the first conductive layer is overlapped with a pattern of the electrodes of the third conductive layer.

9. The touch display panel as claimed in claim 1, further comprising:
    a glass substrate, defined between the second conductive layer and the second polarizer.

10. The touch display panel as claimed in claim 1, further comprising:
    a glass substrate, defined between the first polarizer and the first conductive layer.

11. A method of manufacturing a touch display panel, comprising:

forming a first conductive layer on a first glass substrate, the first conductive layer comprising a plurality of electrodes that are insulated from one another, and the electrodes of the first conductive layer comprising a plurality of first electrodes, a plurality of second electrodes, and a plurality of third electrodes;

forming a color filter, for filtering colors for a plurality of display units of the touch display panel;

forming a second conductive layer on a second glass substrate, the second conductive layer comprising a plurality of pixel electrodes;

insulating each of the first electrodes from each of the second electrodes;

interlacing the first electrodes and the second electrodes in a first direction;

forming a sensing group by coupling at least two of the first electrodes;

insulating the first electrodes and the second electrodes from the third electrodes; and forming another sensing group by coupling at least two of the third electrodes.

12. The method as claimed in claim 11 further comprising:
forming the first electrodes in a way that a cross-section size of each of the first electrodes in the first direction changes along a second direction; and
forming the second electrodes in a way that a cross-section size of each of the second electrodes in the first direction changes along the second direction inversely relative to the first electrodes, the second direction being perpendicular to the first direction.

13. The method as claimed in claim 11, further comprising forming the electrodes by dividing the first conductive layer by a plurality of insulation gaps.

14. The method as claimed in claim 11, further comprising:
transmitting a common voltage from the first conductive layer; and
dividing the first conductive layer into the electrodes by a plurality of insulation gaps.

15. The method as claimed in claim 11, further comprising forming a third conductive layer for transmitting a common voltage via the conductive fabrication.

16. The method as claimed in claim 15, further comprising dividing the third conductive layer into a plurality of electrodes via a plurality of insulation gaps.

17. The method as claimed in claim 11, further comprising:
gluing a first polarizer and a second polarizer to the first glass substrate and the second glass substrate, respectively.

18. A method for reducing errors due to an insulation gap in a touch sensor, said method comprising the steps of:
sensing a capacitance variance of each of a first set of electrodes to obtain a first variance;
sensing a capacitance variance of each of a second set of electrodes to obtain a second variance;
sensing a capacitance variance of each of a third set of electrodes to obtain a third variance;
obtaining a gain value according to a difference between said first variance and said second variance;
determining a y coordinate offset according to said capacitance variances of each of the first, second, and third sets of electrodes;
compensating said y coordinate offset according to said gain value to obtain a compensated y coordinate offset.

* * * * *